United States Patent [19]

Oshima et al.

[11] Patent Number: 4,889,174

[45] Date of Patent: Dec. 26, 1989

[54] PNEUMATIC RADIAL TIRES

[75] Inventors: Kazuo Oshima, Higashiyamato; Shizuo Iwasaki, Kodaira, both of Japan

[73] Assignee: Bridgestone Corp., Tokyo, Japan

[21] Appl. No.: 927,016

[22] Filed: Nov. 5, 1986

[30] Foreign Application Priority Data

Nov. 5, 1985 [JP] Japan .................................. 60-246317
Jun. 13, 1986 [JP] Japan .................................. 61-136285

[51] Int. Cl.⁴ .......................................... B60C 09/26
[52] U.S. Cl. .................................... 152/529; 152/527
[58] Field of Search ............... 152/527, 526, 529, 528, 152/451, 537, 536; 57/902; 264/210.8

[56] References Cited

U.S. PATENT DOCUMENTS

| | | | |
|---|---|---|---|
| 3,826,298 | 7/1974 | Tanaka et al. ....................... | 152/527 |
| 3,874,436 | 4/1975 | Hashida et al. ...................... | 152/534 |
| 4,286,645 | 9/1981 | Boileau .............................. | 152/534 |
| 4,436,131 | 3/1984 | Yamaguchi et al. ........... | 152/537 X |
| 4,440,711 | 4/1984 | Kwon et al. ................. | 264/210.8 X |
| 4,603,083 | 7/1986 | Tanaka et al. ............... | 264/210.8 X |

*Primary Examiner*—David Simmons
*Assistant Examiner*—Ramon R. Hoch
*Attorney, Agent, or Firm*—Sughrue, Mion, Zinn, Macpeak and Seas

[57] ABSTRACT

A pneumatic radial tire having improved cornering stability, service durability and rolling resistance is provided by using high-elasticity, high-strength vinylon fiber having specified elongation and strength as a cord material for at least one belt layer in a belt composed of at least two belt layers. Particularly, noise level can be reduced without damaging other tire performances by combining at least one layer of high-elasticity, high-strength vinylon fiber cords with at least one layer of steel cords as a belt of the tire.

4 Claims, 3 Drawing Sheets

FIG._1a 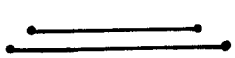
FIG._1b 
FIG._1c 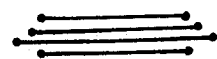
FIG._1d 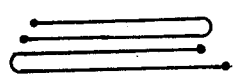
FIG._1e 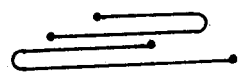
FIG._1f 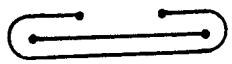
FIG._1g 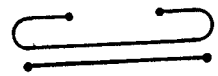
FIG._1h 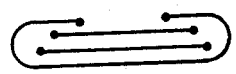
FIG._1i 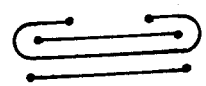

FIG_2
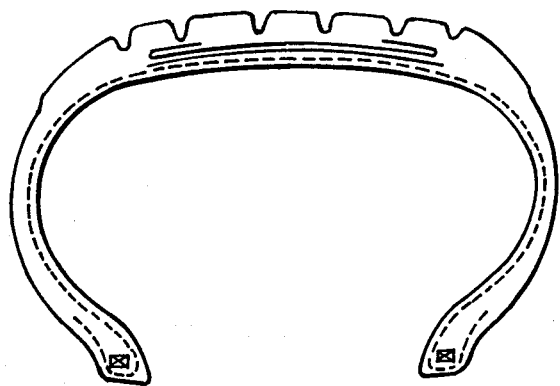
FIG_3
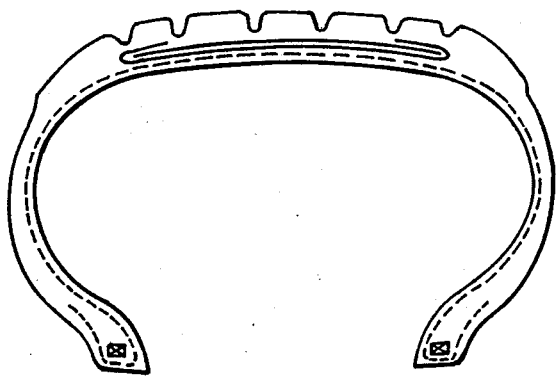

PNEUMATIC RADIAL TIRES

BACKGROUND OF THE INVENTION

1. Field of the Invention

This invention relates to pneumatic radial tires, and more particularly to an improvement in small size radial tires for passenger cars, middle size radial tires for truck and bus, large size radial tires for off-the-road vehicles, and super-high pressure radial tires for airplanes, construction vehicles and so on. And also, it relates to low noise radial tires which can significantly reduce noise level without damaging other tire performance such as running performance, ride comfortability against vibration, wet performance and the like.

2. Related Art Statement

In this type of the radial tire, a belt is arranged as a reinforcing layer between a tread rubber and a carcass of at least one rubberized carcass ply containing cords inclined at about 90° with respect to the circumferential direction of the tire and attached at both ends to a pair of bead cores. This belt serves to increase the rigidity of the tread portion and hence to considerably enhance the cornering stability and wear resistance of the tire as well as lower fuel consumption resulted from the rolling resistance.

Therefore, steel cords are mainly used for the belt. Besides, organic fibers such as aromatic polyamide fiber, rayon fiber, polyester fiber and the like are partially used as a cord for the belt.

In case of using the steel cord, however, the ride comfortability is degraded because the bending rigidity of the tread portion becomes high. Further, since the specific gravity of the steel cord is high, the weight of the tread portion increases, which causes such drawbacks that a great centrifugal force is applied to the tread portion during high-speed running to push the end portion of the belt out toward the treading surface of the tread portion resulting in the occurrence of separation failure between belt and rubber, and that the rolling resistance becomes large due to the increase of the entire tire weight to increase the fuel consumption lately rising in importance. Further, the steel cord is apt to be corroded by water penetrating through a cut portion generated in the treading surface.

Therefore, the use of organic fiber cords, which are originally flexible and are not corroded, is expected instead of the steel cord. However, the rayon fiber cord and polyester fiber cord usually used in the belt are low in the modulus of elasticity as compared with the steel cord, so that they are insufficient in the hoop effect inherent to the belt and poor in the cornering stability and wear resistance. On the other hand, the aromatic polyamide fiber cords having a modulus of elasticity close to that of the steel cord develop the hoop effect substantially equal to that of the steel cord, but are unsatisfactory in the tire durability because such a cord is low in the fatigue resistance and adhesion property.

The use of these conventional belt cords will be described in detail below.

Among the organic fiber cords usually used in the belt, the polyester and rayon fiber cords are low in the modulus of elasticity and are used as such a fold structure that each end portion of the belt is folded radially inward back in order that it is hardly pushed out toward the treading surface by centrifugal force during the high-speed running, whereby the rigidity at the belt end portion is increased.

In such a fold structure of the belt, however, the tire-building operation becomes more complicated due to the increase of step number, and also the belt becomes particularly thicker at the folded end due to the lamination of plural belt layers, and consequently the release of heat generated during the running is less and the separation failure between cord and rubber is apt to be caused at the folded end of the belt layer. Furthermore, even when taking the fold structure, the rigidity of the belt using the polyester or rayon fiber cord is low than that using the steel cord, so that tire performances such as cornering stability, wear resistance and the like are poor. As a result, the tires comprising a belt composed of polyester or rayon fiber cords have to rank as a second-class article as compared with the steel radial tire at present.

On the other hand, the aromatic polyamide fiber cord (hereinafter referred to as aramid cord) is somewhat lower in the modulus of elasticity than the steel cord, so that there are proposed many methods of using the aramid cord for the belt, e.g. a method of piling at least two aramid cord belt layers one upon the other, a method of combining the aramid cord belt layer with steel cord belt layer, a method of folding both end portions of the aramid cord belt layer, and the like.

However, since the aramid cord is poor in the fatigue resistance, when shearing and compressive strains are applied to the treading surface of the tread portion and the belt end portion during the running, the aramid cords in the belt layer are degraded due to fatigue or the breakage of the aramid cord and the separation failure between cord and rubber at the belt end are caused by the wearing or adhesion degradation due to fretting between cords to finally cause the tire burst.

In the fold structure of the belt using the aramid cord, the compressive strain becomes large at the folded end portion, particularly at the folded side of the cord, which is apt to produce the fatigue breakage of the cord. Therefore, there is adopted a techniques for suppressing the compressive strain by increasing the thickness of the coating rubber for the belt layer to make a curvature of the folded cord portion large.

However, this techniques undesirably brings about the increase of tire weight and the promotion of heat accumulation in tire.

Moreover, the copolymer of aromatic diamine and terephthalic acid is highly oriented and crystallized in the aramid, so that the penetrability of adhesive into the aramid cord is poor. Further, only functional groups based on polyamide bond are existent in the surface of the aramid cord and the reactivity of polyamide bond is lowered by the adjacent aromatic ring, so that the reactivity of the aramid cord to the adhesive is low. Therefore, the aramid cord is considered to be fundamentally a poor adhesion cord.

Apart from the above, noises generated from automotive vehicles lately have become a great social problem, and are regulated by law, so that it is urgently needed to reduce the noise level. On the other hand, the ensuring of low noise level in the compartment passenger is required from a viewpoint of the improvement on the living environment of the automotive vehicle. In this connection, the demand for the reduction of noise level is inevitable.

Heretofore, it has been said that the improvement of tread pattern, non-uniformity of tread pattern pitch or the like is effective for the reduction of noise level in the radial tire. However, such a change of tread pattern largely affects the running performances of the tire, particularly braking performance and the like on a wet road surface, so that not only the freedom degree of tire design is largely restricted, but also it is obliged to frequently sacrifice some of the running performances for the obtention of low noise tire.

Therefore, it is desired to establish a technique capable of reducing the noise level without changing the tread pattern. However, there is found no effective technique for the reduction of noise level at present. For example, the noise level can be reduced to a certain level by applying a combination of a steel cord layer and a folded aromatic polyamide fiber cord layer (hereinafter referred to as aramid fold structure) to the belt of usual structure composed of two belt layers. The tires having such an aramid fold structure are highly valued as a low noise tire giving a good living environment even in markets, but the improving degree of noise level in such tires is 0.2–0.3 decibel at most. Thus, it is strongly desired to ensure the large reduction of noise level.

As mentioned above, the change of tread pattern for the reduction of noise level produces the degradation of braking performance on wet road surface, so that the means for reducing noise level without the change of tread pattern is attempted. In this attempt, the reduction of noise level is about 1 decibel at maximum, while it is considered that it is difficult to obtain tires satisfying the tire performances, such as running performances, ride comfortability against vibration and wet performances in addition to the reduction of noise level. Therefore, it is urgently demanded to establish a technique for the obtention of tires having the running performances, ride comfortability against vibration and wet performances equal to those of the conventional tires and reducing the noise level.

SUMMARY OF THE INVENTION

It is, therefore, an object of the invention to provide cords capable of solving the aforementioned drawbacks of the conventional steel cord and organic fiber cord as a reinforcement for the belt of the radial tire.

It is another object of the invention to provide a radial tire having a largely reduced noise level without degrading the running performances, ride comfortability against vibration and wet performances.

The inventors have made various studies with respect to many organic fiber cords in order to solve the above problems and found that pneumatic radial tires having improved cornering stability, high-speed durability and rolling resistance are obtained by using as a cord for belt a novel vinylon fiber having modulus of elasticity and strength higher than those of the conventionally known vinylon fiber and a good adhesion property because many hydroxyl groups of polyvinyl alcohol are existent in the surface of the fiber as a molecular structure. As a result the invention has been accomplished.

Further, the inventors have aimed at the fact that the noise level has been reduced by about 0.3 decibel in the tire having a belt of the conventional aramid fold structure as mentioned above, and made further studies with respect to the belt structure and found that when a belt layer composed of the above-mentioned novel vinylon fiber cords is combined with a belt layer composed of steel cords, the noise level can be reduced by about 3 decibels as compared with the conventional radial tire having a belt composed of two steel cord layers or by about 2.5 decibels as compared with the radial tire having a belt of the aramid fold structure, and as a result the invention has also been accomplished.

According to a first aspect of the invention, there is the provision of a pneumatic radial tire comprising a belt composed of at least two belt layers, characterized in that cords obtained by twisting high-elasticity, high-strength vinylon fibers each having an elongation of not more than 2% under a stress of 4.5 g/d and a strength of not less than 15.0 g/d are used as a reinforcement for at least one belt layer.

According to a second aspect of the invention, there is the provision of a pneumatic radial tire comprising a belt composed of at least two belt layers, characterized in that said belt is constituted by combining at least one belt layer composed of high-elasticity, high-strength vinylon fiber cords each having an elongation of not more than 3% under a stress of 2.25 g/d and a strength of not less than 9.0 g/d with at least one belt layer composed of steel cords.

BRIEF DESCRIPTION OF THE DRAWINGS

The invention will be described with respect to the accompanying drawings, wherein:

FIGS. 1a to 1i are schematically transverse sectional views of various embodiments of the belt structure in the radial tire, respectively; and FIGS. 2 to 5 are schematically sectional views of various embodiments of the tire having the belt according to the invention, respectively.

DESCRIPTION OF THE PREFERRED EMBODIMENTS

Figure 4:
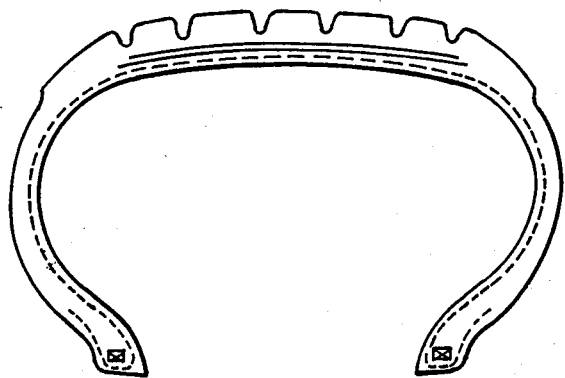

According to the invention, the reason why the elongation and strength of the high-elasticity, high-strength vinylon fiber are limited to the above ranges is based on the fact that since the conventional vinylon fiber has an elongation of about 3.3% under a stress of 4.5 g/d and a strength of about 11 g/d, when such a conventional vinylon fiber is used as a cord material in the belt of the radial tire, the tensile rigidity in the circumferential direction of the tire is insufficiently high and there are caused problems on the tire performances such as cornering stability, high-speed durability, wear resistance and the like. That is, the vinylon fiber is required to have an elongation of not more than 2% under a stress of 4.5 g/d in order to obtain a satisfactory cornering stability. While, when the vinylon fiber is applied to the cord for the belt, it is safe that the strength of the cord becomes higher, so that the vinylon fiber is required to have a strength of not less than 15 g/d even when considering the wet heat degradation as a weak point of the vinylon.

Such a high-elasticity, high-strength vinylon fiber can be produced by a method wherein the drawing ratio is increased during the spinning of polymer having a molecular weight considerably larger than that of the polymer usually used in the production of the conventional vinylon fiber, a method of spinning from a diluted solution of a super-high molecular weight polymer or a so-called gel spinning method, a method wherein the drawing ratio is largely increased after dry and wet spinning of a polymer having a sufficiently high molecular weight or the like as disclosed, for example, in Japanese Pat. laid open No. 60-126,311 and No. 60-126,312. Furthermore, the modification of vinylon fiber such as improvement of resistance to wet heat degradation or the like can be carried out by such a chemical modification of vinylon that the drawn fiber is subjected to a heat treatment or a post treatment with acetal or formal.

The thus obtained high-elasticity, high-strength vinylon fibers are subjected to a cable twisting or a ply twisting for enhancing not only the bundling property but also the fatigue resistance of the resulting cord, which are bundled together to form a twisted cord. When the resulting twisted cords are used as a reinforcement for the tire, they may be knitted into a tire cord fabric together with a warp yarn, or may be subjected to a dipping treatment with a usual dipping solution for tire cord composed of resorcinol-formaldehyde-latex and further to a heat treatment.

In the first aspect of the invention, when the above high-elasticity, high-strength vinylon fibers are used as a cord material for the belt, it is preferable to use a coating rubber for the belt cord having specified properties. Thus, the vinylon cord enhances the tensile rigidity in the circumferential direction of the tire, while the coating rubber for belt cord enhances the shearing rigidity against the transverse deformation of the belt layer, whereby the rigidity of the belt can uniformly be improved in both transverse and circumferential directions of the tire to further enhance the cornering stability and wear resistance.

Since the cornering stability and wear resistance are matters in the running of the tire, the coating rubber for belt cord according to the invention is necessary to have a dynamic modulus (E') of $0.7 \times 10^8 - 1.2 \times 10^8$ dyn/cm$^2$ as measured at 120° C. and 50 Hz under a strain of 1%, which is higher than that usually used in the conventional radial tire when the dynamic modulus is less than $0.7 \times 10^8$ dyn/cm$^2$, the modulus at high temperature becomes insufficient and the rigidity of the belt lowers. When it exceeds $1.2 \times 10^8$ dyn/cm$^2$, the rigidity is too large and the ride comfortability is undesirably degraded.

When the cord made from the high-elasticity, high-strength vinylon fiber according to the invention is used as a cord for the belt, a separate lamination structure of at least two belt layers as shown in FIGS. 1a to 1c may be applied as a belt structure because the vinylon fiber cord according to the invention is higher in the modulus of elasticity than the conventional polyester or rayon fiber cord. In such a separate lamination structure, since the vinylon fiber cord is good in the adhesion property to rubber as compared with the aramid cord, the separation failure between cord and rubber is hardly caused at the belt end portion and also the durability is good.

Moreover, in order to enhance the rigidity of the belt, it is a matter of course to use a combination of the vinylon fiber cord layer with a steel cord layer in the separate lamination structure of the belt.

In addition, the vinylon fiber cord according to the invention may be applied to a fold structure as shown in FIGS. 1d to 1i.

Particularly, when the vinylon fiber cord is applied to the fold structure used in the conventional polyester or rayon fiber cord as shown in FIG. 1d or 1e, the rigidity of the belt can be increased to largely improve the cornering stability of the tire. Further, when the vinylon fiber cord is applied to the fold structure as shown in FIGS. 1f to 1i, it is a matter of course that the vinylon fiber cord layer may be combined with a steel cord layer. In the latter case, when the steel cord layer is an unfolded belt layer and the vinylon fiber cord layer is a folded belt layer, the flexibility of the vinylon fiber is advantageously utilized in the tire-building stage to facilitate the folding operation as compared with the case of using the folded steel cord layer, and the rigidity of the belt is effectively enhanced by the use of the unfold steel cord layer. Furthermore, since the both end portions of the unfold steel cord layer is protected by the folded vinylon fiber cord layer, the breakage due to crack growth at the end of the unfolded belt layer can be prevented.

In the conventional fold structure using the combination of unfolded steel cord layer and folded aramid cord layer, the breakage of the cord at the inside of the folded portion due to the compressive fatigue and the adhesion breakage at the outside of the folded portion are apt to be caused as previously mentioned. In case of using the folded vinylon fiber cord layer, however, the above problems are hardly caused because the fatigue resistance and adhesion property are improved as compared with those of the aramid cord, and consequently the durability, particularly high-speed durability of the tire is largely improved. Furthermore, since the vinylon fiber cord is superior in the fatigue resistance to the aramid cord, the breakage due to fatigue degradation as in the fold structure of the aramid cord is suppressed, so that it is possible to make the thickness of the coating rubber thin, resulting in the weight-saving of the tire.

In the second aspect of the invention, it is necessary to use the combination of steel cord layer and vinylon fiber cord layer as mentioned above in the belt of the radial tire in order to attain the reduction of noise level. In this case, the vinylon fiber cord is required to have an elongation of not more than 3% under a stress of 2.25 g/d and a strength of not less than 9.0 g/d after the vulcanization. As mentioned later, when the belt is made only from at least two vinylon fiber cord layers instead of the above combination, the effect of reducing the noise level is hardly developed.

In general, the noise generated from the tire is mainly a tread pattern noise, which is considered to be a sound produced by compressing or releasing air inside concave portions of the pattern when the treading surface of the tread portion steps in or kicks out against road surface. In order to reduce the pattern noise, therefore, it is important to diminish the change of increase or decrease of air pressure inside the concave portion at the ground contact area of the tire.

Such air pressure inside concave portion is considered to be largely influenced by the rigidity of the belt, particularly the rigidity of outermost belt layer. For instance, when the belt is made from the steel cord or aramid cord, the rigidity of the belt becomes too large, so that the tread pattern hardly moves in the stepping-in or kicking-out during the running of the tire, and consequently air is enclosed in the concave portion at ground contact area to considerably increase the air pressure. On the other hand, when the rigidity of the belt is too small, the tread pattern is changed into a uniformly broken state and consequently it is difficult to release compressed air from the concave portion at ground contact area. In this connection, when the belt is constructed by using the combination of vinylon fiber cord layer and steel cord layer according to the invention, the rigidity of the belt is sufficient to suppress the occurrence of pattern noise, and the noise level can be reduced by 2-3 decibels as compared with the case of using the belt of separate lamination structure composed of two steel cord layers.

When the combination of vinylon fiber cord layer and steel cord layer is applied to the separate lamination structure as shown in FIGS. 1a to 1c, if at least one vinylon fiber cord layer is superimposed on the steel cord layer arranged near the carcass, the noise reduction effect is more preferably obtained. Further, sufficient reduction of noise level can be obtained even when the above combination is applied to the fold belt structure as shown in FIGS. 1d to 1i. In the latter case, the vinylon fiber cord layer is used as a folded belt layer.

The following examples are given in the illustration of the invention and are not intended as limitations thereof.

EXAMPLES 1–4, COMPARATIVE EXAMPLES 1–6

In this example, fibers as shown in the following Table 1 were used as a cord material for a belt, subjected to cable twisting and ply twisting, and then shaped into a cord having a structure shown in Table 1. The resulting cord was subjected to a dipping treatment with a dipping solution prepared as follows. That is, a mixed solution of 220 g of water, 17 g of resorcin, 25 g of 37% formalin and 10 g of 10% NaOH aqueous solution was aged at 25° C. for 12 hours and added to a mixed solution of 300 g of water, 280 g of commercially available vinylpyridine latex (made by Japan Synthetic Rubber K.K.) and 148 g of commercially available styrene-butadiene latex (made by Japan Synthetic Rubber K.K.) with stirring, and then the resulting mixed solution was aged at 25° C. for 12 hours to form a dipping solution.

Then, the thus dipped cord was subjected to a heat drying treatment under conditions that it was passed through a dry zone under a tension of 500 g for 120 seconds, a hot zone under a tension of 2.5 kg for 40 seconds and a normalizing zone under a tension of 2.0 kg for 40 seconds in this order.

The thus treated cord was used in a belt of a radial tire having a tire size of 185/70 HR 14 and comprising a radial carcass composed of one rubberized ply containing polyester cords of 1500 d/2 with a twisting number of 40×40 T/10 cm.

After the vulcanization, rubber test and tire test were made as follows.

(1) Rubber Test

The dynamic modulus (E') was measured with respect to a sample of 2 cm in length by using a vibron-type spectrometer under conditions of 120° C., 50 Hz, strain of 1% and initial tension of 200 g.

(2) Test for High-Speed Durability (Drum Test)

This test was carried out according to FMVSS-109 process for high-speed durability test. That is, the tire subjected to an internal pressure of 2.1 kgf/cm$^2$ was left to stand at room temperature of 25° C.±1° C. for 24 hours and then the internal pressure was again adjusted to 2.1 kgf/cm$^2$. Thereafter, the tire was trained on a drum of about 2 m in diameter at a speed of 81 km/hr under a JIS normal load or 100% load at internal pressure of 2.1 kgf/cm$^2$ for 2 hours. Next, the trained tire was gradually cooled to room temperature. After the internal pressure was readjusted to 2.1 kgf/cm$^2$, the tire was run on the drum while stepwise raising the speed from 121 km/hr every 30 minutes, whereby the speed and time till the breakage of the tire was measured.

(3) Test for Cornering Stability (Feeling Test)

The test tire was mounted on a passenger car and actually run on road, during which a feeling of cornering stability was evaluated by a professional driver. The evaluation of the feeling test was represented by an index on the basis that the result of Comparative Example 1 is 100. The smaller the index value, the worse the feeling.

(4) Test for Rolling Resistance

The rolling resistance was measured by an inertia running process and represented by an index on the basis that the result of Comparative Example 3 is 100. The smaller the index value, the lower the rolling resistance and hence the lower the fuel consumption.

In Example 1 was used a tire having a belt structure as shown in FIG. 2, wherein a first belt layer was superimposed on the carcass ply and composed of steel cords, and a second belt layer was piled on the first belt layer and composed of high-elasticity, high-strength vinylon fiber cords shown in Table 1 and folded inward at both end portion. Further, the cords of the first and second belt layers were inclined at an angle of 13° with respect to the circumferential direction of the tire and crossed

TABLE 1

| | | High-elasticity, high-strength vinylon | Conventional vinylon | Aramid* | Polyester | Rayon |
|---|---|---|---|---|---|---|
| Fiber properties | strength (g/d) | 17.5 | 11.0 | 22.0 | 8.0 | 5.1 |
| | elongation under a stress of 4.5 g/d (%) | 1.8 | 3.1 | 0.9 | 6.4 | 4.1 |
| | specific gravity | 1.30 | 1.28 | 1.44 | 1.38 | 1.52 |
| Properties of dipped cord | strength (g/d) | 12.8 | 10.0 | 16.9 | 6.6 | 3.3 |
| | elongation under a stress of 2.5 g/d (%) | 1.1 | 1.4 | 0.7 | 2.7 | 2.0 |
| | adhesive force (index) | 120 | 115 | 100 | 124 | 131 |
| | fatigue life** | 90° × 9 min | 50° × 4 min | 40° × 20 min | 90° × 2 min | 80° × 10 min |
| Structure of cord | | 1500 d/2 | 1800 d/2 | 1500 d/2 | 1500 d/2 | 1650 d/2 |
| Twisting number (T/10 cm) | | 20 × 20 | 18 × 18 | 21 × 21 | 23 × 23 | 35 × 35 |

*Use of Kevlar (trade mark) made by DuPont as an aramid
**The rotating bending angle and time until the cord was broken were measured by stepwisely the rotating bending angle from 10° up to 90° every 30 minutes in a Goodyear's tubular fatigue testing machine. The larger the value, the better the fatigue resistance.

with each other. The steel cord used in the first belt layer had a construction of 1×5 with a filament diameter of 0.68 mm and a strength of 65 kg/cord, while the end count of vinylon fiber cord in the second belt layer was 40 cords/5 cm.

A tire used in Comparative Example 1 was the same as in Example 1 except that the aramid fiber cord shown in Table 1 was used in the second belt layer instead of the vinylon fiber cord.

In Comparative Example 2 was used the same tire as in Example 1 except that a dynamic modulus of a coating rubber for the belt was made lower than that of Example 1 in order to examine the influence of the coating rubber on the performances of the tire.

A tire used in Example 2 was a modified embodiment of Example 1. That is, the first belt layer was arranged inside the folded second belt layer as shown in FIG. 3.

In Example 3 was used a tire having a belt of separate lamination structure as shown in FIG. 4, wherein each of first and second belt layers was composed of high-elasticity, high-strength vinylon fiber cords as shown in Table 1 at an end count of 40 cords/5 cm. The cords of the first and second belt layers were inclined at an angle of 15° with respect to the circumferential direction of the tire and crossed with each other.

A tire used in Comparative Example 3 was the same as in Example 3 except that each of the first and second belt layers was composed of steel cords used in Example 1 instead of the vinylon fiber cords.

Figure 5:
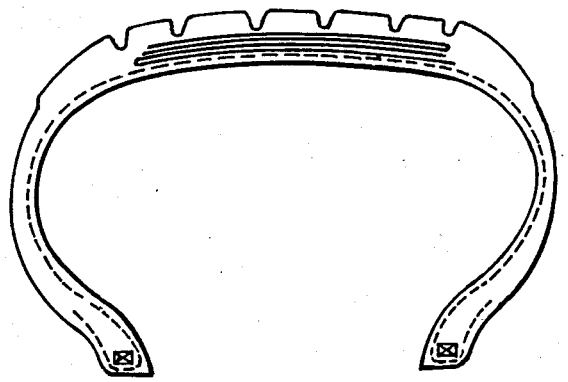

In Example 4 was used a tire having a belt structure as shown in FIG. 5, wherein each of first and second belt layer is folded inward at one end in the widthwise direction of the tire to locate the folded ends of these layers in the opposite direction. Further, each of the first and second belt layers was composed of the same high-elasticity, high-strength vinylon fiber cords as used in Example 3. In this case, the cords of the first and second belt layers were inclined at an angle of 15° with respect to the circumferential direction of the tire and crossed with each other.

Tires used in Comparative Examples 4–6 were the same as in Example 4 except that the polyester fiber cord, rayon fiber cord and conventional vinylon fiber cord as shown in Table 1 were used instead of the high-elasticity, high-strength vinylon fiber cord, respectively.

The aforementioned tests were made with respect to the above tires to obtain results as shown in the following Table 2.

TABLE 2

|  | Example 1 | Example 2 | Comparative Example 1 | Comparative Example 2 | Example 3 |
|---|---|---|---|---|---|
| Kind of cord in belt | high-elasticity, high-strength vinylon | high-elasticity, high-strength vinylon | aramid | high-elasticity, high-strength vinylon | high-elasticity, high-strength vinylon |
| Belt structure* | ⊂──────⊃ | ⊂──────⊃ | ⊂──────⊃ | ⊂──────⊃ | ======== |
| Dynamic modulus of coating rubber for belt E' (dyn/cm$^2$) | $0.98 \times 10^8$ | $0.98 \times 10^8$ | $0.98 \times 10^8$ | $0.58 \times 10^8$ | $0.98 \times 10^8$ |
| Cornering stability (index) | 100 | 100 | 100 | 96 | 98 |
| High-speed durability | 209 km × 29 min | 217 km × 5 min | 201 km × 10 min | 201 km × 15 min | 185 km × 16 min |
| Rolling resistance (index) | 96 | 96 | 96 | 98 | 94 |

|  | Comparative Example 3 | Example 4 | Comparative Example 4 | Comparative Example 5 | Comparative Example 6 |
|---|---|---|---|---|---|
| Kind of cord in belt | steel cord | high-elasticity, high-strength vinylon | polyester | rayon | conventional vinylon |
| Belt structure* | ======== | ⊃──────⊂ | ⊃──────⊂ | ⊃──────⊂ | ⊃──────⊂ |
| Dynamic modulus of coating rubber for belt E' (dyn/cm$^2$) | $0.98 \times 10^8$ | $0.98 \times 10^8$ | $0.98 \times 10^8$ | $0.98 \times 10^8$ | $0.98 \times 10^8$ |
| Cornering stability (index) | 98 | 98 | 92 | 96 | 96 |
| High-speed durabiltiy | 185 km × 17 min | 193 km × 15 min | 177 km × 10 min | 185 km × 4 min | 185 km × 18 min |
| Rolling resistance (index) | 100 | 100 | 102 | 104 | 101 |

*Dotted line is organic fiber cord and solid line is steel cord

From the results of Table 2, it can be seen that when the belt structure is same, the tires using as a cord for belt the high-elasticity, high-strength vinylon fiber cord according to the invention are superior in the cornering stability, high-speed durability and low fuel consumption based on rolling resistance to the tires using the conventional organic fiber cord or steel cord.

Further, it has been confirmed that even when using the high-elasticity, high-strength vinylon fiber cord in the same belt structure, if the dynamic modulus E' of the coating rubber for the belt is lower than the given level, the cornering stability, high-speed durability and rolling resistance are degraded.

EXAMPLE 5

In this example, cords as shown in the following Table 3 were used as a cord for a belt to prepare a radial tire of 185/70 HR 13 having a radial carcass of a rubberized cord ply made from polyester fiber cords of 1500 d/2 (40×40 T/10 cm), provided that each cord was formed by the same method as described in Example 1.

defined in JIS D4202. In this case, a standard rim defined in JIS D4202 was used.

After a microphone was arranged at a position separated away by 1 m from the tire, preliminary running was performed at a speed of 60 km/hr for 30 minutes and then the internal pressure and load were readjusted. Thereafter, noise level (dB) was measured at a speed ranging from 30 km/hr to 110 km/hr, from which an average noise level (dB(A)) was calculated.

TABLE 3

| | | Aramid* | High-elasticity, high-strength vinylon | Conventional vinylon | Polyester | Rayon | Nylon |
|---|---|---|---|---|---|---|---|
| Fiber properties | strength (g/d) | 22.0 | 17.5 | 11.0 | 8.0 | 5.1 | 9.5 |
| | elongation under a stress of 4.5 g/d (%) | 0.8 | 1.8 | 3.1 | 6.4 | 4.1 | 11.0 |
| | specific gravity | 1.44 | 1.30 | 1.28 | 1.38 | 1.52 | 1.43 |
| Properties of cord taken out from vulcanized tire | strength (g/d) | 16.9 | 13.5 | 8.3 | 7.1 | 5.0 | 8.5 |
| | elongation under a stress of 2.2 g/d (%) | 1.0 | 1.8 | 3.3 | 3.4 | 3.3 | 10.0 |
| Structure of cord (twisting number (T/10 cm) | | 1500 d/2 (32 × 32) | 1500 d/2 (30 × 30) | 1800 d/2 (31 × 31) | 1500 d/2 (23 × 23) | 1650 d/2 (29 × 29) | 1260 d/2 (39 × 39) |

*Use of Kevlar (trade mark) made by DuPont as an aramid

The resulting tire was subjected to the following tests:

(1) Strength and Elongation

The strength (g/d) at room temperature of 25±2° C. and elongations (%) under stresses of 2.25 g/d and 4.5 g/d were measured from autographs according to a method of JIS L1017, respectively. Moreover, the denier of the fiber before twisting was used as a denier number, because it was required to avoid the complicated change of denier number due to the change of cord length based on the twisting, dipping treatment, shrinking in vulcanization of tire and the like.

(2) Measurement of Noise

This measurement was performed by a drum test on single tire according to a method of JASO (Jidosha-Gijutsu Kai) C606-81. An outline of such a test was described as follows.

In this test was used a testing machine provided with a drum of 3 m in diameter having a flat and rough surface of high friction coefficient and a means for applying a load to the tire. After noise protecting structure was applied to the testing machine and a testing chamber housing this machine so as to prevent invasion of noise from outside as far as possible, the tire was placed on the drum under maximum load and internal pressure

(3) Cornering Stability

A test tire subjected to internal pressure of 1.70 kg/cm$^2$ was placed on a drum of 2,500 mm in outer diameter and then trained at a speed of 30 km/hr under a load of 395 kg for 30 minutes. After the internal pressure was readjusted to 1.70 kg/cm$^2$ under non-load, a load of 390 kg was applied to the tire and then a slip angle up to 14° at maximum was continuously applied leftside and rightside to the tire while running on the drum at the same speed. Thus, a cornering force (CF) at each slip angle was measured, from which a cornering power (CP) was calculated according to the following equation:

$$CP(kg/degree) = \frac{CF(1°)(kg) + CF(2°)(kg)/2 + CF(3°)(kg)/3 + CF(4°)(kg)/4}{4°}$$

The cornering stability was represented by an index on the basis that CP of Run No. 1 tire was 100. The larger the index value, the better the cornering stability.

These tests were made with respect to tires having a belt structure shown in the following Table 4 to obtain results as shown in Table 4.

TABLE 4

| Run No. | 1 | 2 | 3 | 4 | 5 | 6 | 7 | 8 | 9 |
|---|---|---|---|---|---|---|---|---|---|
| Kind of cord in belt | steel | aramid | high-elasticity, high-strength vinylon | high-elasticity, high-strength vinylon | high-elasticity, high-strength vinylon | high-elasticity, high-strength vinylon | conventional vinylon | polyester | nylon |
| Belt structure* | ═══ | (═══) | (═══) | (═══) | (═══) | (═══) | (═══) | (═══) | (═══) |
| Noise level dB (A)** | 81.3 | 81 (−0.3) | 78.5 (−2.8) | 78 (−3.3) | 78.2 (−2.1) | 81.2 (−0.1) | 79.0 (−2.3) | 78.8 (−2.5) | 81.5 (+0.2) |
| Cornering stabiltiy | 100 | 102 | 101 | 104 | 105 | 97 | 95 | 90 | 69 |

*Dotted line is organic fiber cord and solid line is steel cord.
**The lower the noise level, the better the result.

The tire of Run No. 1 had a belt of separate lamination structure composed of two steel cord layers each containing steel cords inclined at an angle of 15° with respect to the circumferential direction of the tire. The cords of the first and second belt layers were crossed with each other. The steel cord had a structure of 1×5 with a filament diameter of 0.68 mm and a strength of 65 kg/cord. This tire had an end count of 38 cords/5 cm and corresponded to a commercially available radial tire.

The tire of Run No. 6 had the same structure as in Run No. 1 except that the cords made from the high-elasticity, high-strength vinylon fiber shown in Table 3 were used instead of the steel cord.

As seen from Table 4, since the rigidity of the belt and the bending rigidity of the cord in Run No. 6 are low as compared with those of Run No. 1, the cornering stability is somewhat poor and the reduction of noise level is hardly obtained.

The tire of Run No. 2 had the aramid fold structure as previously mentioned. That is, the belt consisted of a first belt layer made from the same steel cords as in Run No. 1 and a second folded belt layer made from the aramid fiber cords shown in Table 3 at an end count of 40 cords/5 cm, wherein the cords of the first and second layers were inclined at an angle of 13° with respect to the circumferential direction of the tire and crossed with each other.

As seen from Table 4, the cornering stability is improved as compared with the case of Run No. 1, but the effect of reducing the noise level is little.

The tire of Run No. 3 was the same as in Run No. 2 except that the high-elasticity, high-strength vinylon fiber cord shown in Table 3 was used as a second folded belt layer instead of the aramid fiber cord.

When the tire of Run No. 3 is compared with the tire of Run No. 1, the noise level is reduced by 2.8 dB(A), and also the cornering stability is improved as seen from Table 4.

The tires of Run Nos. 4 and 5 were modified embodiments of Run No. 3, respectively. That is, a third belt layer made from the high-elasticity, high-strength vinylon fiber cords was further housed in the second folded belt layer. In these tires, the cornering stability and noise level reduction are considerably improved as seen from Table 4.

The tires of Run Nos. 7 to 9 were the same as in Run No. 3 except that the conventional vinylon fiber cord, polyester fiber cord and nylon cord were used as a second folded belt layer instead of the high-elasticity, high-strength vinylon fiber cord, respectively.

As seen from Table 4, in the tires of Run Nos. 7 and 8, the noise level reduction is attained, but the cornering stability is degraded because the modulus of elasticity of the cord is low. Particularly, in case of using the nylon fiber cord, the modulus of elasticity is too low to facilitate the movement of tread pattern, so that the noise level reduction and cornering stability are considerably degraded.

As mentioned above, in the radial tire according to the invention, the high-elasticity, high-strength vinylon fibers having given high modulus of elasticity and strength are used as a cord material for the belt, so that the cornering stability, service durability, particularly high-speed durability and low fuel consumption are considerably improved. Furthermore, when such a vinylon fiber cord layer is combined with steel cord layer as a belt, the sufficient reduction of noise level is attained without damaging tire performance such as running performance, ride comfortability against vibration, wet performance and so on.

What is claimed is:

1. A pneumatic radial tire comprising; a tread portion, a carcass ply and a belt composed of a first belt layer superimposed on the carcass ply and made of steel cords, a second belt layer piled on the first belt layer and made of cords obtained by twisting polyvinyl alcohol fibers each having an elongation of not more than 2% under a stress of 4.5 g/d and a strength of not less than 15.0 g/d, and a third belt layer made of cords obtained by twisting polyvinyl alcohol fibers each having an elongation of not more than 2% under a stress of 4.5 g/d and a strength of not less than 15.0 g/d, said third belt layer housed in said second belt layer by said second belt folded radially inward back at both ends portions.

2. The pneumatic radial tire according to claim 1, wherein said first and second belt layers are housed in a third folded belt layer, said third belt layer made of cords obtained by twisting polyvinyl alcohol fibers each having an elongation of not more than 2% under a stress of 4.5 g/d and a strength of not less than 15.0 g/d.

3. The pneumatic radial tire according to claim 1, wherein said second belt layer has a coating rubber having a dynamic modulus of $0.7 \times 10^8 - 1.2 \times 10^8$ dyn/cm$^2$.

4. The pneumatic radial tire according to claim 2, wherein said second belt layer has a coating rubber having a dynamic modulus of $0.7 \times 10^8 - 1.2 \times 10^8$ dyn/cm$^2$.

* * * * *